March 29, 1966 M. FRIEDLAND ETAL 3,243,055
HIGH SPEED FOLLOWER GAUGE
Filed April 26, 1963 6 Sheets-Sheet 1
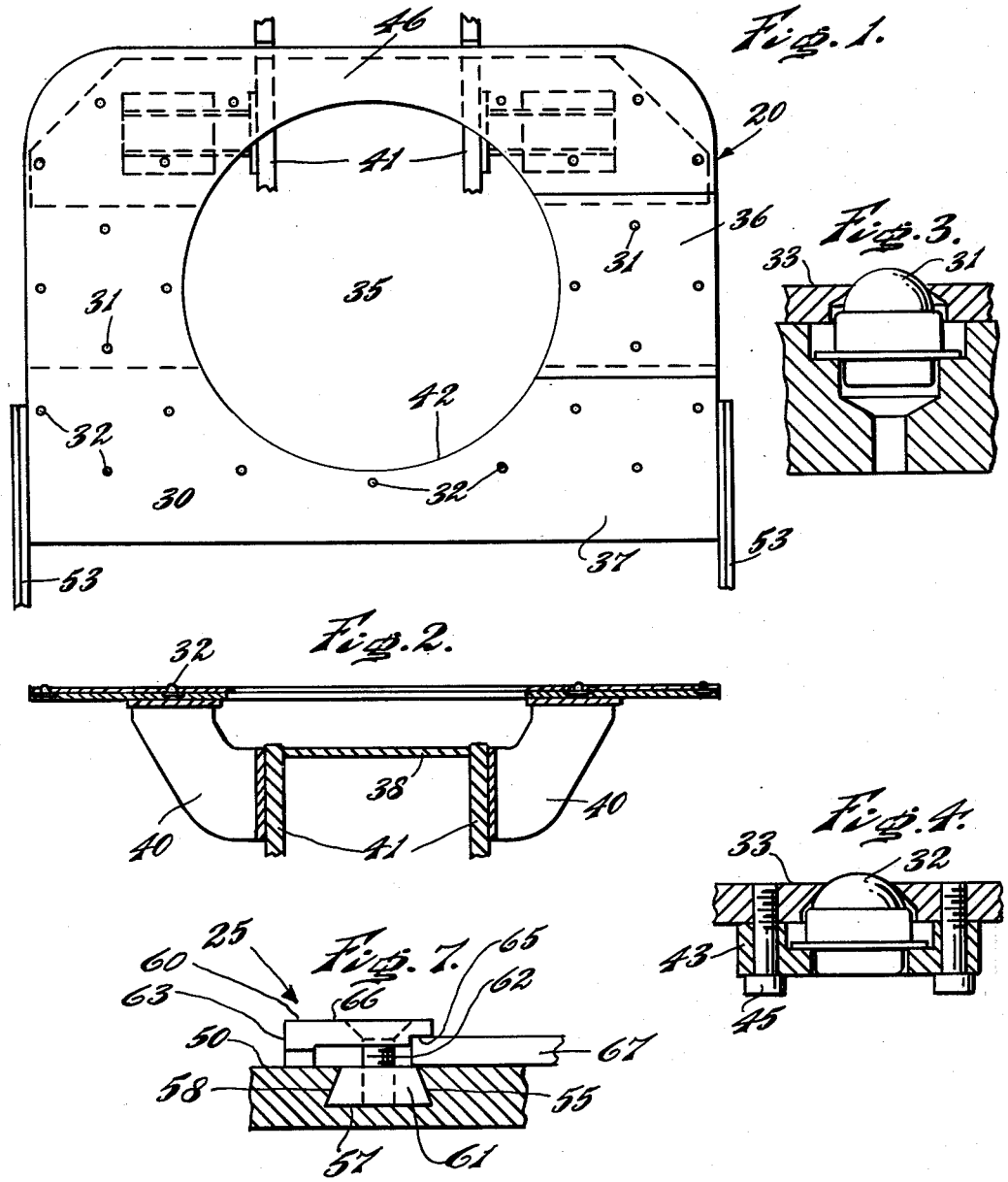
INVENTORS
Martin Friedland
Frederick W. Schneider
BY
ATTORNEYS

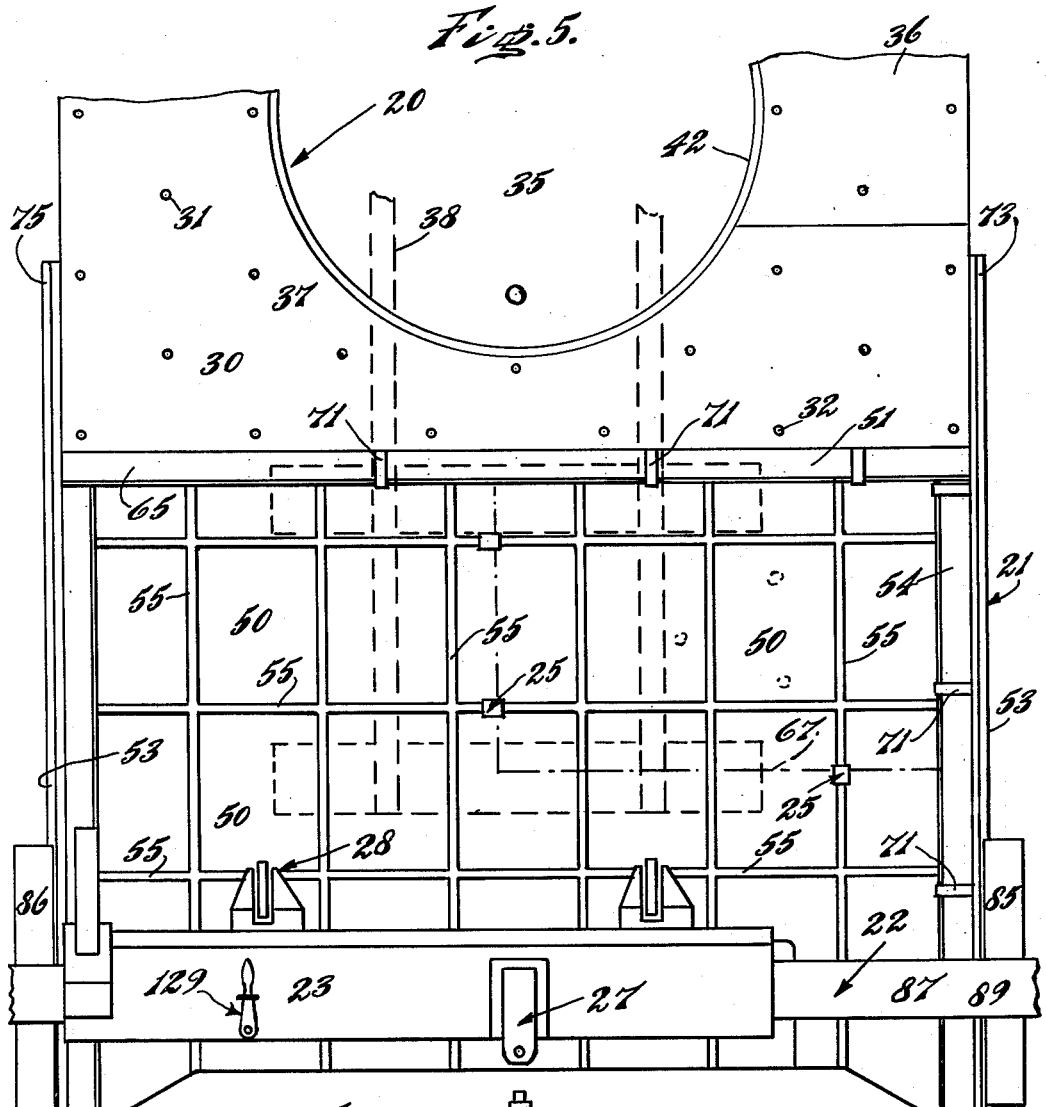
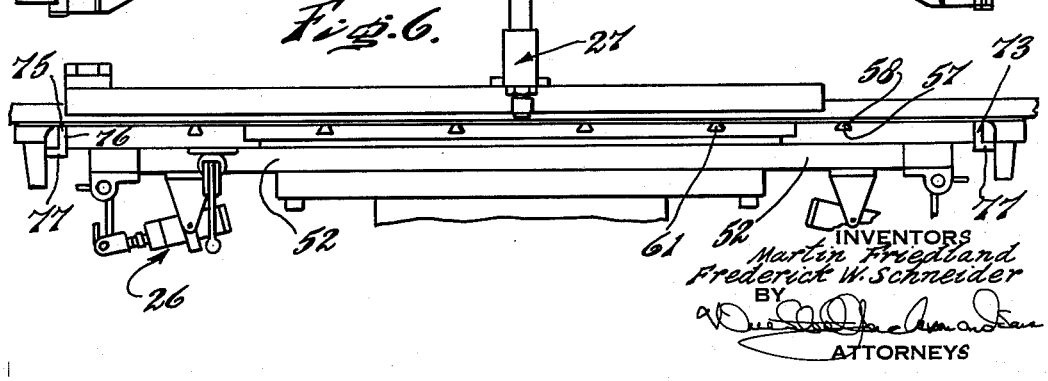

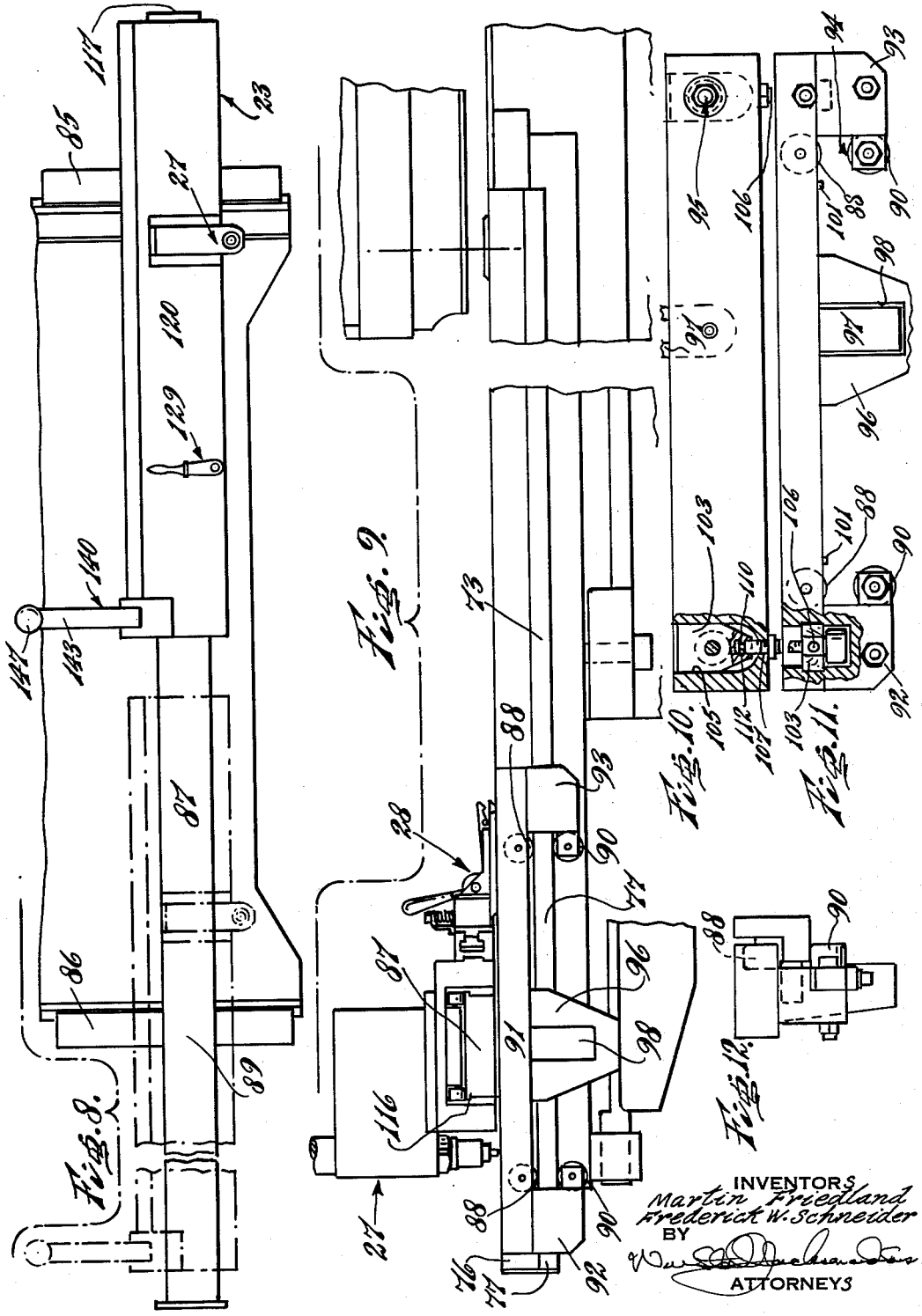

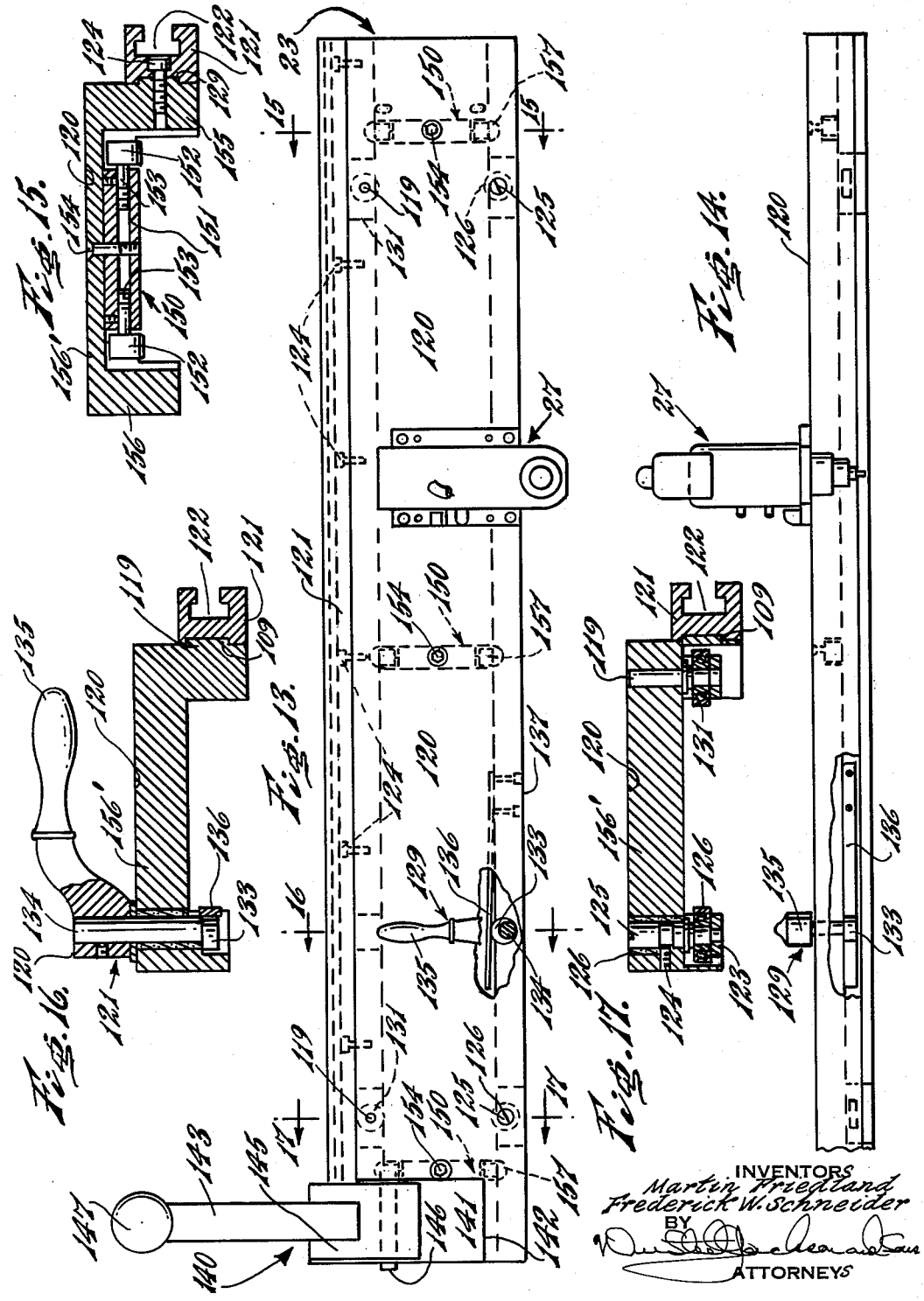

March 29, 1966   M. FRIEDLAND ETAL   3,243,055
HIGH SPEED FOLLOWER GAUGE
Filed April 26, 1963   6 Sheets-Sheet 5
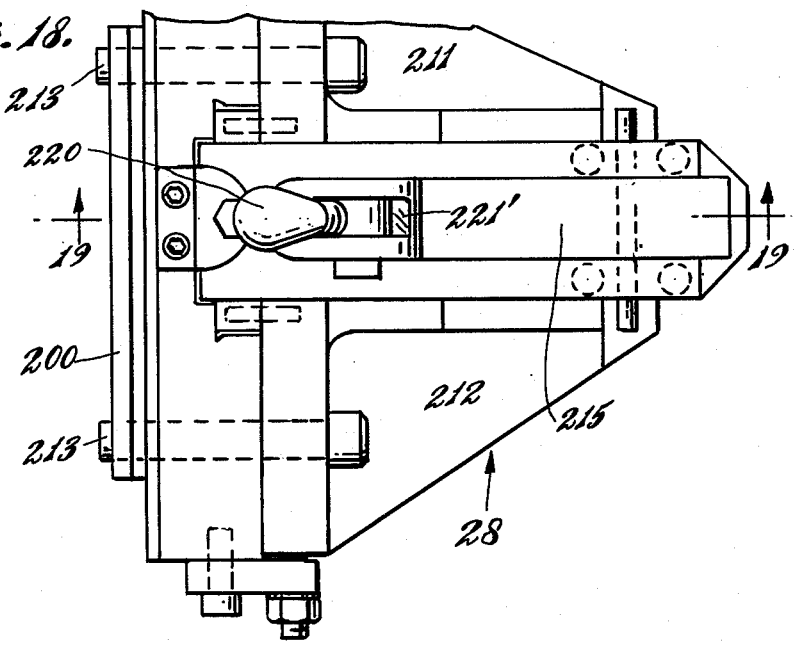
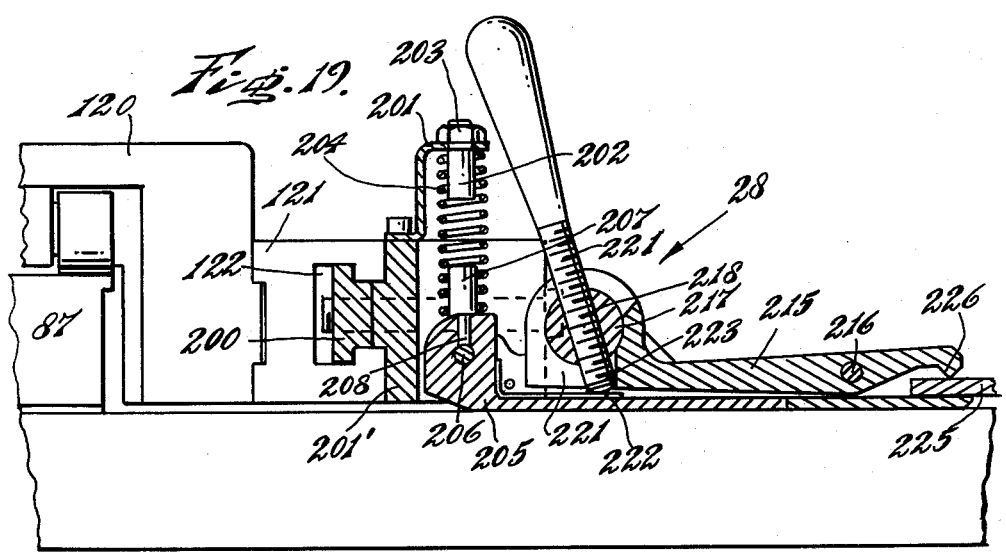
INVENTORS
Martin Friedland
Frederick W. Schneider
BY
ATTORNEYS

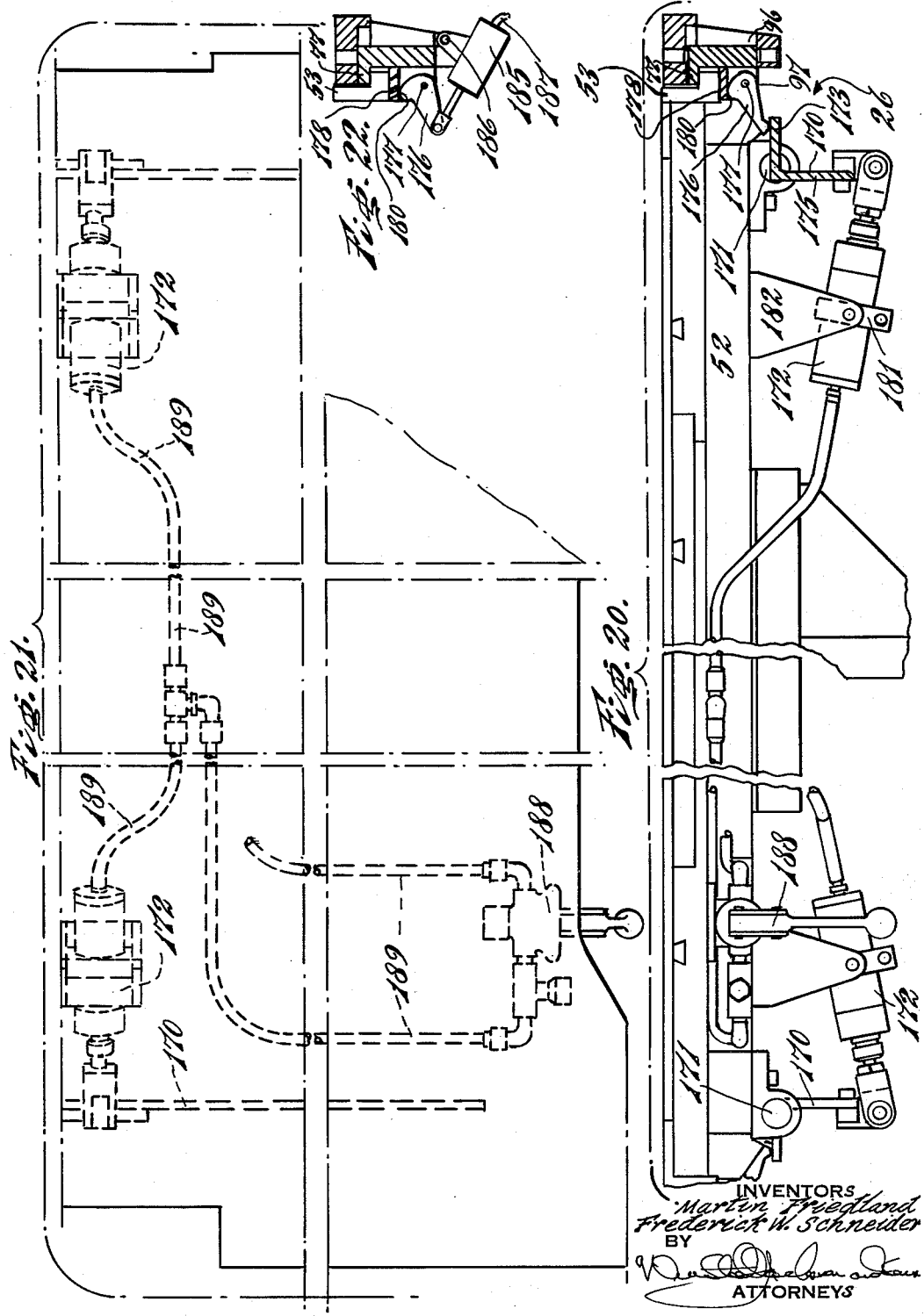

United States Patent Office 3,243,055
Patented Mar. 29, 1966

1

3,243,055
HIGH SPEED FOLLOWER GAUGE
Martin Friedland, Flourtown, and Frederick W. Schneider, Levittown, Pa., assignors, by mesne assignments, to The Warner & Swasey Company, Cleveland, Ohio, a corporation of Ohio
Filed Apr. 26, 1963, Ser. No. 275,851
10 Claims. (Cl. 214—1.3)

The present invention relates to a high speed follower gauge for combination with, for instance, a machine tool, especially a turret punch press.

A purpose of the invention is to provide a high speed follower gauge adapted to engage openings in a template and position a workpiece in a machine tool at a location determined by the template openings.

A further purpose of the invention is to facilitate the manipulation of a worksheet on a work table of a machine tool by supporting the work in an improved manner on a cross slide mounted on a slidable cross bar.

A further purpose is to provide a high speed follower gauge and to combine such a gauge with a machine tool, especially a turret punch press.

A further purpose is to provide a gauge which is supported on a table which can be supported from a press frame.

A further purpose is to mount the gauge on a table which can be an integral part of a press.

A further purpose is to position a template in fixed position on a table bed, to provide rails on either side of the bed, to extend a gauge bar over the bed and slidable on the rails, to mount a cross slide slidable on the gauge bar, to clamp the work on the cross slide and to position a stylus on the cross slide which registers with points on the template.

A further purpose is to provide uniform openings in the template and to extend a stylus in snugly fitting relationship into the openings.

A further purpose is to mount a stylus in a sliding guide which permits the stylus to be depressed into a selected opening of the template and preferably to close an electric switch operating the machine tool when the stylus is depressed.

A further purpose is to provide an improved clamp for locating the cross bar in any desired position on the rail.

A further purpose is to provide an improved clamp for locking the cross slide in any desired position on the cross bar.

A further purpose is to provide walls on the cross slide having longitudinally work locating surfaces, workholders extending out beyond the work locating surfaces and connected to the cross slide, a clamp pivot on each pair of jaws and a quick action clamp lever threaded through each pivot and applying pressure between the jaws of the workholder.

A further purpose is to make the gripping distance between the jaws adjustable.

A further purpose is to provide inverted V grooves in the main table bed to provide an anchorage for the template holding clamps.

A further purpose is to place the end locator on top of the cross slide so that when the work locator is put into an active position, there is no interference by the yoke or any of the hinge mechanism of the work locator with the workholders.

A further purpose is to use an eccentric stud to clamp the cross slide to the cross bar.

A further purpose is to use a trolley lock activated by an air cylinder mounted right on the trolley with flexible hoses supplying air to the cylinder.

2

A further purpose is to use an improved workholder which is adjustable and provides an adjustable clamp for different size sheets.

A further purpose is to use an improved adjustment of the horizontal guide roller assembly which comprises a sliding block guided in a groove which is positioned by a threaded screw which engages screw threads in a trolley housing.

A further purpose is to eliminate extensive linkage arrangements in a rail lock.

A further purpose is to use top roller assemblies in the cross slide assembly comprising a bearing block and cam rollers positioned at the end of the bearing blocks and journalled on shafts which are set in the bearing blocks and held therein.

A further purpose is to eliminate needle bearings in the cross slide assembly.

A further purpose is to use trolleys having adjustable preload assemblies.

A further purpose is to locate the end locator assembly on top of the cross slide assembly to avoid interference with the workholders.

A further purpose is to mount a pivoted clamping handle on the cross slide and to extend an eccentric shaft from the handle which brings pressure against the gauge bar.

A further purpose is to provide precise adjustment both for set-up purposes and to compensate for wear on all of the units of a machine which require adjustment.

Further purposes appear in the specification and in the claims.

In the drawings we have chosen to illustrate one only of the numerous embodiments in which our invention may appear, the form and variation shown being chosen from the standpoints of convenience in illustration, satisfactory operation and clear demonstration of the principles involved.

FIGURE 1 is a top plan view of the rear filler table of the gauging table of the invention.

FIGURE 2 is a front elevational section of the filler table of FIGURE 1.

FIGURE 3 is an elevational section of the rear roller ball of the filler table of FIGURES 1 and 2.

FIGURE 4 is an elevational section of the front roller ball of the rear filler table of FIGURES 1 and 2.

FIGURE 5 is a top plan view of the main table assembly.

FIGURE 6 is a front elevational view of the front table assembly of FIGURE 5.

FIGURE 7 is an elevational section showing the clamp assembly of the invention.

FIGURE 8 is a plan view of the cross bar and trolley assembly of the gauge of the invention.

FIGURE 9 is a front elevation of the assembly of FIGURE 8.

FIGURE 10 is a top plan view of the trolley assembly partly broken away.

FIGURE 11 is a side elevation of the trolley assembly of FIGURE 10 partly broken away.

FIGURE 12 is an end elevation of the trolley assembly of FIGURES 10 and 11 partly broken away.

FIGURE 13 is a top elevation of the cross slide assembly of the invention.

FIGURE 14 is a partial front elevation of the cross slide assembly of FIGURE 13.

FIGURE 15 is a vertical section taken on the line 15—15 of FIGURE 13.

FIGURE 16 is a vertical section taken on the line 16—16 of FIGURE 13.

FIGURE 17 is a vertical section taken on the line 17—17 of FIGURE 13.

FIGURE 18 is a top plan view of the workholder of the invention.

FIGURE 19 is a vertical section taken on the line 19—19 of FIGURE 18.

FIGURE 20 is a front elevation of one embodiment of the rail lock assembly of the invention.

FIGURE 21 is a top plan view showing partially the rail lock of the invention in phantom.

FIGURE 22 is a front elevation of a modified rail lock assembly.

Describing in illustration but not in limitation and referring to the drawings:

Gauging tables have been used in machine operations especially those of instantaneous character, where it is desirable to obtain high production rates without the necessity of building very expensive production tools, such as gang punches and other production tool set-ups. These gauging tables have been used to locate points on a workpiece with great accuracy and speed.

Such gauging tables are made up of a cross slide which holds the workpiece which is slidable laterally on a cross bar and the cross bar in turn is slidable longitudinally on fixed tracks along the side of the table bed. The position of the work in any operation is determined by a stylus which moves over a template fixed on the table bed. The table carries indications, suitably holes, which designate the center on which any machining operation is to be performed and the stylus by location over the designated position on the template automatically locates the work correspondingly for performing a particular work operation at the machine tool work axis.

The function generally speaking of the gauge assembly is to so position the workpiece in for instance, a press to obtain accurate and controlled punch holes in the workpiece at a designated location.

In the present invention, the workholder assemblies slide along the front of the T slot rail on the front of the cross slide. The end locator assemblies are positioned on top of the cross slide assembly so that when the work locator lever is put into an active position, there is no interference by the yoke or any of the hinge mechanism with the workholder. The workpiece can be brought right up against the work locator so that it is now feasible to use only one holder on a small piece of work where the holder is placed close to the work locator.

In the present invention, an eccentric stud is used to clamp the cross slide to the cross bar.

In the present invention, the trolley lock is activated by an air cylinder which in one instance is mounted right on the trolley with flexible hoses supplying air to the cylinder, and in another instance, the air cylinder activates a rotating angle to engage a cam lock.

In the present invention, an improved workholder which is adjustable and provides an adjustable clamp for different size sheets is used. The clamp is adjusted by means of a screw lever which is advanced or retracted to provide an increase throw on the clamp pivot.

In the present invention, an improved adjustment of the horizontal guide roller of the trolley assembly is presented. A sliding block is guided in a groove which is positioned by a threaded screw which engages screw threads in the trolley housing. By rotating the screw, the sliding block can be slid back and forth to obtain the correct amount of preload on the trolley.

In the present invention, top roller assemblies are used which are placed in the cross slide assembly. These top roller assemblies comprise a bearing block and cam rollers positioned at the end of the bearing blocks and journalled on shafts which are set in the bearing blocks and held therein.

In the present invention, inverted V grooves are used in the main table to provide a high degree of precision for the clamps and provide a much less expensive means for cutting the grooves.

Other improvements will be set forth in the specification and in the drawings.

Reference will now be made to the drawings and the invention set forth in detail.

*Gauge assembly*

The gauge assembly consists of the rear filler table assembly 20, the main table assembly 21, the cross bar and trolley assembly 22, the cross slide assembly 23, the clamp assembly 25, the rail lock assembly 26, a stylus assembly 27 and a workholder assembly 28. The stylus assembly can be of any suitable type.

*Rear filler table assembly*

The rear filler table assembly 20 is in the form of a flat horizontally extending surface 30 having spaced ball rollers 31 and 32 on the surface of the filler table top 33 which have the function of slidably supporting the worksheet over the punch and die area 35. A removable section 36 is fitted at the right hand side of the filler table to provide access to the press tools in the turret for changing the tools.

The filler table 37 is supported from the press frame 38 by brackets 40 which extend from the side plates 41 of the frame and also by the main table assembly 21. The rear filler table 37 is fixed with respect to the punch frame 38. The filler table 37 has a circular opening 42 of sufficient size to expose the turrets of a press so that a punch of the press can enter the workpiece and proceed into the die.

The ball rollers 31 and 32 are held in place by retainers 43 and socket head cap screws 45. A support plate 46 extends around the back of the filler table and provides a rearward bearing surface for the filler table. The top surface of the ball rollers in the filler table are in the plane of the top surface of the die of the turret press. Hence, a workpiece is supported from the ball rollers and the top of the dies when the piece is in punching operation.

The top surface of the balls 32 at the front of the filler table 37 are lower than the top surface of the balls 31 at the rear of the filler table 37. For instance, there may be a $\frac{3}{32}$ of an inch differential. This differential provides clearance for the lower jaw of the workholders as later described.

The workpiece sheet which will extend horizontally and will be supported on the front rollers 32 when the sheet is toward the front of the press and will be supported by the back rollers 31 as well as the top surface of the die when the sheet is in punching position.

*Main table assembly*

The main table assembly 21 consists of a template supporting surface 50 forwardly of the rear filler table 37, locating strips 51, main table supporting structure 52, and trolley rails 53 extending longitudinally along the sides of the table. The function of the main table assembly 21 is to fix in a horizontally extending plane a template sheet 67 having punched holes which receive the stylus point of a stylus assembly 27 for positioning a workpiece underneath the punch of, for instance, a turret press, at a specific location.

The template supporting surface 50 has inverted truncated V grooves 55 extending transversely and longitudinally in a grid relationship. These V grooves receive clamps 25 which are suitably positioned to engage the perimeter of the template and hold the template in firm relationship to the locating strips 51 and 54.

The grooves have a bottom horizontal surface 57 and inclined side surfaces 58.

The clamp assembly 25 which is adapted to engage the inverted truncated V groove 55 consists of a clamp portion 60 and a nut portion 61 joined by a flat head socket screw 62. The nut is adapted to slide in the groove and generally conform to the shape of the groove. The clamp portion has a fulcrum 63 and a clamp end 65 whereby the flat head socket screw bears against the extension 66 and forces the clamp against the template 67.

The locating strips include a Y axis locating strip 51, which is disposed transversely to the longitudinal axis of the crankshaft of a turret punch press if used for instance, with such a press, and an X axis locating strip 54 which is disposed along the right hand side of the main support table surface 50 in a direction parallel to the longitudinal axis of such a crankshaft. Hence, the X and Y locating strips are disposed at an exact 90 degree relationship to one another.

Overhanging clamps 71 extend from the top surface of the X locating strip 54 and Y locating strip 51 to hold down the two edges of a flat sheet template 67 which is brought into engagement with the locating strips 51 and 54. Thus, it will be seen that a template 67 can be supported in an exact square relationship to the longitudinal axis of the crankshaft by means of the X locating strip 54, the Y locating strip 51, the top surface 50 of the template support table, and clamps 25 which engage the template at the edges removed from the locating strips and which in turn engage the inverted V grooves 55 of the main table surface.

The top surfaces of the X and Y locating strips are level.

Trolley rails 73 and 75 are fixed at the sides of the main table supporting structure 52 and extend longitudinally of the table. In this position the rails will extend parallel to the Y axis locating strip and transverse to the X axis locating strip. The trolley rails 73 and 75 are of an L cross section and have a web portion 76 and a flange portion 77.

In actual construction, the side trolley rails are mounted on the table surface 50 in a direction exactly parallel to the longitudinal axis of the crankshaft of the press. The X axis locating strip 54 is then mounted on the work support table exactly parallel to the trolley rails 73 and 75 and the Y axis locating strip 51 is mounted exactly transverse to the trolley rails 73 and 75. In this position, the locating strips 54 and 51 and side rails 73 and 75 will be positioned exactly on the square to one another.

*Cross bar and trolley assembly*

The cross bar and trolley assembly 22 consists of a right hand trolley assembly 85 and a left hand trolley assembly 86 and a cross bar 87. The right hand trolley assembly 85 is a mirror image of the left hand trolley assembly 86. The trolley assemblies ride on the left and right hand rails respectively longitudinally of the table and are tied together by a cross bar 87 rigidly fixed to the trolleys by suitable fastenings at 89. The left hand trolley assembly 86 has upper rollers 88 and lower rollers 90 at each end of the assembly which engage the rails. The trolley assembly has a trolley 91 of a rectangular form having downwardly extending extensions 92 and 93, and a lower roller bearing assembly 94. Viewed in plan there are side roller assemblies 95 which prevent sideward movement of the trolley.

In the center of the trolley 91 there is a downwardly extending rail lock bracket 96 and a rail lock clamp 97 which extends vertically through the lower portion 98 of the rail lock bracket 96. A wiper 101 is placed in a trolley to provide for a cleaning action on the trolley track. The right hand trolley assembly 85 is identical to the left hand trolley assembly 86 except that the parts are reversed.

The trolley assemblies 85 and 86 can be adjusted by adjusting the horizontal guide roller assembly 95. This is best seen in the plan which shows a sliding block 103 guided in a groove 105 which is positioned by a threaded screw 106 which engages screw threads 107 in the trolley housing. The screw 106 can rotate within a hole 110 in the sliding block 103 and is held therein by a pin 112 which engages a grooved portion in the screw. Hence, by rotating the screw, the block 103 can be slid back and forth to obtain the correct amount of preload on the trolley in a transverse direction. In this manner a parallel adjustment between the cross bar and the Y locating strip is obtained.

The cross section of the cross bar 87 is rectangular except for flanges 15 and 16 which are utilized to restrain the cross slide from upward movement. A stop 117 is bolted to the end of the cross bar 87 to prevent movement of the cross assembly later described from leaving the cross bar.

*Cross slide assembly*

The cross slide assembly 23 is adapted to ride along the cross bar 87 and consists of a cross slide 120 which in cross section is in the form of an inverted U. The cross slide 120 has bolted at the rear thereof a bar 121 which has a T groove 122 extending longitudinally along the bar. The bar 121 is held to the cross slide by stud 124 and tongue and groove connection 109. The function of this bar is to support the workholders.

The rear bearings 131 are fixed on shaft 119. The forward bearings 126 are provided with an eccentric adjustment for preload and alignment. A bearing block 123 mounted in the cross slide 120 on an eccentric shaft 125 supports a ball bearing 126 which is adapted to ride against the side of the cross bar. The eccentric shaft 125 is rotated to provide horizontal adjustment of the bearing 126 with respect to the cross bar 87. A set screw 124 engages a groove 126 on the eccentric shaft 125 to rotationally lock the shaft in proper adjustment.

The cross slide assembly is preferably aluminum casting to reduce weight.

Mounted in the cross slide 120 is a cross slide clamp 129 comprising a shaft 134 carrying an eccentric 133 at one end and a clamp lever 135 at the other end, the shaft 134 being designated as an eccentric stud. By rotating the clamp lever 135 the eccentric 133 engages a pressure plate 136 spring mounted at 137 to the cross slide which presses against the side of the cross bar and locks the cross slide 120 with respect to the cross bar 87. The purpose of locking the cross bar 87 to the cross slide 120 will be later seen where for instance a series of holes extending in an X direction on the template 67 can be engaged by the stylus assembly 27 without constantly shifting the stylus assembly 27 and cross slide 120 with respect to the cross bar 87.

The stylus assembly 27 which can be of any suitable type is adjustably fixed to the cross slide 120. The function of this stylus assembly will be later explained.

An end locator assembly 140 is mounted at the end of the cross slide assembly on a mounting plate 141 fixed on the top of the cross slide 120 at 142. The end locator assembly 140 comprises a pivot arm 143, a yoke 145 on the pivot arm, a key 146 for positioning the yoke 145 on the mounting plate 141 and a knob 147 on the pivot arm 143. The pivot arm 143 is capable of being rotated from a rearward direction into a forward position in a vertical plane. The function of the end locator assembly 140 is to position the left hand edge of the workpiece with respect to the cross slide assembly 23.

A top roller assembly 150 is placed in the cross slide assembly 23 and comprises a bearing block 151 held to the slide by studs 154 and cam rollers 152 positioned at the end of the bearing blocks and journalled in shafts 153 which are set in the bearing blocks 151 and held therein.

The cross slide 120 is in the form of an inverted U and has a back flange 155 adapted to extend over the cross bar 87 and a front flange 156 adapted to extend over the cross bar 87. The flanges 155 and 156 also serve the purpose of journalling the bearings 126 and 131 which engage the sides of the cross bar as described above. The web 156' of the cross slide 87 has a series of transversely disposed slots 157 which are adapted to receive the mounting blocks 151 which journal the cam rollers 152.

The function of the cross slide clamp 129 is to lock the cross slide 120 to the cross bar 87 so that the stylus assembly 27 may engage a plurality of longitudinally disposed holes in the template 67 in a forward and rearward motion without concern with transverse movement of the cross slide 120. It should be understood that normally, however, the cross slide assembly 23 will slide transverely with respect to the cross bar as shown by the phantom position of the slide and the solid position of the slide as seen in FIGURE 8.

*Rail lock assembly*

The function of the rail lock assembly 26 is to lock the trolleys to the trolley rails 73 and 75 to prevent longitudinal motion of the trolleys. This fixes the cross bar 87 in a position over the template table. With the cross bar 87 fixed the cross slide assembly 23 can travel transversely over the template to for instance engage a plurality of template holes without concern for any longitudinal motion of the cross slide.

The rail lock assembly 26 consists in one embodiment of a trolley mounted portion and a main table support mounted portion. A longitudinally extending angle 170 is pivotally supported at 171 on the underside of the main table support 52 at the ends and an air cylinder 172 is used to rotate the angle 170 on the axis formed at the intersection of the flanges 173 and 175. The flange 173 of the angle 170 engages a locking cam 176 which is pivotally mounted on the trolley at 177 and which engages a flexible wear plate 178 which, under the action of the locking cam 176, clamps the plate 178 to the underside of the trolley rail at 180. The cam pin 177 which pivotally supports the locking cam is supported by the bracket 96 described earlier which extends downwardly from the trolley 91. The air cylinder 172 is rotatably held in a trunnion block 181 journalled in a trunnion bracket 182 which is fixed to the main table support 52. The length of the rotating angle 170 extends entirely along the trolley tracks 73 and 75 so that regardless of where the trolley is located, the locking cam 176 on the trolley will be activated by engagement of the cam 176 with the flange 173 of the angle 170.

In an alternative embodiment, the locking angle 170 and stationary air cylinders 172 are omitted and a small air cylinder 185 is pivotally mounted at 186 on the trolley, the piston of the cylinders pivotally connecting with the locking cam 176. A flexible hose 187 supplies air under pressure to the cylinder. In this embodiment, the cylinder 185 travels right with the trolley and the cylinder is selectively activated by application of air to bring the cam 176 into engagement with the wear plate 178 which clamps to the underside of the trolley rail.

In both embodiments described above, an air valve 188 located at the front of the main table is controlled by an operator whereby air under pressure can be selectively admitted to the cylinders 172 or 185 to clamp the trolley to the trolley tracks which are fixed on the main support table which holds the template.

It should be understood that the rail locks on the left and right hand side are identical except they are reversed.

*Workholder assembly*

The function of the workholder assembly is to hold the workpiece in fixed relation to the cross slide 120 so that the movement of the cross slide 120, both longitudinally and transversely, is faithfully imparted to the workpiece.

Workholder assemblies 28 are supported from the workholder supporting strip 121 bolted to the front of the cross slide 120. A T bar 200 rides in slot 122 and supports a bracket 201 which has fixed thereon a stud 202 and a nut 203. A lower jaw 205 is pivoted on pivot 206. A stud 207 is fixed on a lower jaw at 208 and receives the other end of helical compression spring 204. The spring 204 tends to keep the lower jaw 205 in a downmost position.

Guides 211 and 212 are held to support 201' by suitable bolts 213. An upper jaw 215 is pivoted on pin 216 held in guides 211 and 212, and has journalled therein a clamp pivot 217 which has a tap hole 218 passing therein. A clamp lever 220 having a threaded portion 221 is threadably engaged with tap hole 218 and extends through a vertically extending slot 221' extending through upper jaw 215. A wear plate 222 is fixed to the lower jaw to slidably support the end 223 of clamp 220.

In operation, clamp lever 220 is screwed into clamp pivot 217 to extend out the bottom of the slot 221 of the upper jaw 215 and come into engagement with plate 222. The amount of engagement of the lever 220 into clamp pivot 217 will determine the throw of pivot 217 and this will establish the gripping distance between the upper and lower jaw. The clamp lever 220 is rotated with respect to the upper jaw to cause the upper jaw to come into gripping position and grip a plate or workpiece 225 at 226. In the alignment of the workholder assembly spring 204 biases stud 207 in vertical alignment with stud 202, but movement of the upper and lower pin about pivot 206 is allowed to compensate for slight upward movement of the workpiece during the machine operation on the piece, as for instance where the punch on a punch press is being stripped from the piece. This spring causes the assembly to return to its proper position after removal of the external disturbing forces on the worksheet.

It will be seen that as the cross slide 120 slides transversely on the cross bar 87 and longitudinally on the trolleys, the workpiece 225 will be held in fixed relationship to the cross slide.

It will be noted that since the end locator 140 is mounted on the top surface of the cross slide 120, the workholder 28 can be brought completely to the extreme end position since there is no interference by any end locator mounting.

*Operation*

In the operation of the gauge of the invention, a template 67 is laid on the template supporting surface 50 with its backward edge in abutment with the locating strip 51 and the right edge in contact with the X locating strip 54. The template is positioned beneath the extending clamps 71 so that it is held snugly to the surface 50. Clamps 25 are brought into engagement with the edges of the template opposite from the X and Y locating strips. The clamp engages the inverted V slots on the surface and the lever of the clamp engages the template at its edge. The clamps are tightened into position.

The template has a number of suitable holes 69 at desired locations which will be engaged by the stylus of the stylus assembly 27. The worksheet is positioned in the workholder assemblies 28 with the left edge of the workpiece abutting against the pivot arm 143 of the end locator assembly 140. The relationship between the stylus assembly 27, the workholder assembly 28 and the edge of the end locator pivot arm 143 is such to the X and Y locator strips 51 and 54 that when the stylus assembly 27 is engaged in a template opening 69 the workpiece is held in position on the machine tool so that the machine operation is placed at a location corresponding to the template opening.

The cross bar and trolley assembly 22 is free to move longitudinally over the template 67 and the cross slide assembly is free to move transversely on the cross bar. Hence, the stylus assembly 27 can be located over any point in the template 67 to properly position the workpiece.

In the event that it is desirable to lock the cross slide assembly 23 to the cross bar assembly 22 so that a plurality of longitudinally aligned holes on the template 67 may be engaged by the stylus assembly 27, the clamp lever 135 is rotated to cause the eccentric 133 to bear against the wear plate 136 and lock the cross slide 110 to the cross bar 87.

In the event it is desired to lock the trolleys 85 to the trolley rails, the operator opens valve 188 to allow air under pressure to pass through lines 189 to the air cylinders. In the one embodiment the air cylinders will rotate the longitudinal angle 170 causing the locking cam 176 to engage the wear plate 178 and lock the trolley to the rail. In the alternative embodiment the air cylinder 185 will be energized and will rotate the locking cam to in turn lock the trolley to the rail.

In view of our invention and disclosure, variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. In a gauging table, a rear filler table assembly, a main table assembly connected to the rear filler table assembly, a cross bar and trolley assembly on the main table assembly, a cross slide assembly on the cross bar and trolley assembly, a rail lock assembly on the main table assembly and the cross bar and trolley assembly, and a stylus assembly and a workholder assembly on the cross slide assembly, wherein the workholder assembly comprises a base, an upper and lower jaw pivotally supported on the base, a clamp pivot in the upper jaw, a tapped hole in said clamp pivot, and an adjustable threaded lever adapted to pass through said tapped hole and bear on said lower jaw whereby said upper and lower jaws are brought into gripping engagement with a workpiece.

2. A gauging table of claim 1, wherein the workholder assembly lever is adjustable longitudinally with respect to the clamp pivot whereby the gripping distance between the upper and lower jaw can be varied.

3. A gauging table of claim 1, wherein the rear filler table assembly comprises a frame support, a flat horizontally extending surface in supporting relationship to a machine tool on the support, and spaced ball rollers in the surface adapted to slidably support a worksheet.

4. A gauging table of claim 1, wherein the main table assembly comprises a support, a template supporting surface on the support, a pair of locator strips transversely disposed to one another fixed on said surface, rails on the support and extending parallel to one of said locating strips, grooves in the supporting surface extending parallel to one of said locating strips, said grooves having an inverted V cross section, and clamps in the grooves.

5. In a gauging table of claim 1, a cross bar and trolley assembly including a right hand trolley assembly, a left hand trolley assembly, a cross bar fixed to the left and right hand trolley assemblies wherein each of the trolley assemblies has a housing, upper rollers and lower rollers journalled on the housing, and a horizontal die roller assembly journalled on the housing including a sliding block, rollers journalled on said block, a threaded screw connected to said block, and means for positioning the screw with respect to the housing, whereby a preload can be obtained on the cross bar and trolley assembly.

6. In a gauging table of claim 1, a cross slide assembly comprising a cross slide, bearings on the cross slide adapted to engage the cross bar including rear bearings, forward bearings having an eccentric adjustment for preload and alignment including a bearing block, a shaft, a ball bearing on the shaft, and a top roller assembly including a bearing block, stud means holding the bearing block to the slide, and cam rollers journalled on the bearing block.

7. A gauging table of claim 6, in combination with a cross slide clamp assembly having a shaft, an eccentric on the shaft, a clamp lever on the shaft, and a pressure plate on the cross slide adapted to be selectively engaged by the eccentric.

8. A gauging table of claim 6, in combination with an end locator assembly mounted on top of the cross slide and having a pivot arm, a yoke pivotally supporting the pivot arm, and a mounting plate on the cross slide supporting the yoke, wherein the pivot arm has a first position in which the said arm extends over the template supporting surface and a second position in which the said arm lies adjacent the cross slide.

9. A gauging table of claim 1, in which the rail lock assembly comprises an angle pivotally mounted on the main table support, an air cylinder mounted on the main table support and adapted to selectively rotate the angle, a locking cam pivotally mounted on the trolley, and a wear plate on the trolley adapted to be selectively forced into engagement with the trolley rail by the locking cam.

10. A gauging table of claim 1, wherein the rail lock assembly comprises an air cylinder mounted on the trolley, a locking cam pivotally mounted on the trolley and connected to the air cylinder, a wear plate adapted to be selectively engaged by the locking cam and forced against the trolley rail, and means for selectively supplying air to the air cylinder.

References Cited by the Examiner

UNITED STATES PATENTS

| | | | |
|---|---|---|---|
| 836,423 | 11/1906 | Wilzin | 214—1.3 |
| 2,491,469 | 12/1949 | Anderson | 33—23 |
| 3,199,686 | 8/1965 | Wasserman | 214—1 |

FOREIGN PATENTS 799  1/1895  Great Britain.

MARVIN A. CHAMPION, *Primary Examiner.*